US009878308B2

(12) United States Patent
Ito et al.

(10) Patent No.: US 9,878,308 B2
(45) Date of Patent: Jan. 30, 2018

(54) EXHAUST GAS PURIFICATION CATALYST

(71) Applicant: NISSAN MOTOR CO., LTD., Yokohama-shi, Kanagawa (JP)

(72) Inventors: Junji Ito, Kanagawa (JP); Yasunari Hanaki, Kanagawa (JP); Tetsuro Naito, Kanagawa (JP); Misaki Akaishi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/309,930

(22) PCT Filed: Jan. 16, 2015

(86) PCT No.: PCT/JP2015/051126
§ 371 (c)(1),
(2) Date: Nov. 9, 2016

(87) PCT Pub. No.: WO2015/174102
PCT Pub. Date: Nov. 19, 2015

(65) Prior Publication Data
US 2017/0266644 A1 Sep. 21, 2017

(30) Foreign Application Priority Data
May 13, 2014 (WO) .................. PCT/JP2014/062666
May 13, 2014 (WO) .................. PCT/JP2014/062667

(51) Int. Cl.
*B01J 23/00* (2006.01)
*B01J 23/02* (2006.01)
(Continued)

(52) U.S. Cl.
CPC .......... *B01J 23/83* (2013.01); *B01D 53/9472* (2013.01); *B01J 23/002* (2013.01); *B01J 23/10* (2013.01);
(Continued)

(58) Field of Classification Search
CPC . B01J 23/002; B01J 23/10; B01J 23/34; B01J 23/83; B01D 53/9472;
(Continued)

(56) References Cited

U.S. PATENT DOCUMENTS 6,536,210 B1 * 3/2003 Komoriya .......... B01D 53/9418
502/302
6,881,384 B1 * 4/2005 Uenishi ................ B01D 53/945
422/177

(Continued)

FOREIGN PATENT DOCUMENTS

| EP | 2 025 399 A1 | 2/2009 |
| JP | 2002-126522 A | 5/2002 |
| JP | 2005-254217 A | 9/2005 |

*Primary Examiner* — Jun Li
(74) *Attorney, Agent, or Firm* — Foley & Lardner LLP

(57) ABSTRACT

An exhaust gas purification catalyst includes: a first catalyst unit that consists of a hydrogen generating catalyst including a noble metal and an oxide that contains lanthanum, zirconium and an additional element such as neodymium; a second catalyst unit that consists of an oxygen storage/release material and a perovskite oxide disposed in contact with the oxygen storage/release material and represented by the general formula $La_xM1_{1-x}M2O_{3-\delta}$, where La is lanthanum, M1 is at least one element selected from the group consisting of barium (Ba), strontium (Sr) and calcium (Ca), M2 is at least one element selected from the group consisting of iron (Fe), cobalt (Co) and manganese (Mn), x satisfies $0<x\leq 1$, and $\delta$ satisfies $0\leq\delta\leq 1$; and a holding material that holds the first catalyst unit and the second catalyst unit in a mutually separated state.

20 Claims, 10 Drawing Sheets

(51) Int. Cl.
   *B01J 23/83*   (2006.01)
   *B01D 53/94*   (2006.01)
   *B01J 23/10*   (2006.01)
   *B01J 23/34*   (2006.01)
   *B01J 23/46*   (2006.01)
   *B01J 35/00*   (2006.01)
   *B01J 35/04*   (2006.01)
   *B01J 35/10*   (2006.01)
   *B01J 35/02*   (2006.01)
   *B01J 37/02*   (2006.01)
   *B01J 37/08*   (2006.01)

(52) U.S. Cl.
   CPC ............ *B01J 23/34* (2013.01); *B01J 23/464* (2013.01); *B01J 35/0006* (2013.01); *B01J 35/0013* (2013.01); *B01J 35/026* (2013.01); *B01J 35/04* (2013.01); *B01J 35/1038* (2013.01); *B01J 35/1066* (2013.01); *B01J 35/1071* (2013.01); *B01J 37/0201* (2013.01); *B01J 37/0236* (2013.01); *B01J 37/088* (2013.01); *B01D 2255/204* (2013.01); *B01D 2255/207* (2013.01); *B01D 2255/2063* (2013.01); *B01D 2255/2065* (2013.01); *B01D 2255/2068* (2013.01); *B01D 2255/20715* (2013.01); *B01D 2255/20738* (2013.01); *B01D 2255/402* (2013.01); *B01D 2255/9032* (2013.01)

(58) Field of Classification Search
   CPC .... B01D 2255/9032; B01D 2255/2063; B01D 2255/207; B01D 2255/20738; B01D 2255/204; B01D 2255/2065; B01D 2255/20715; B01D 2255/2068; B01D 2255/402
   See application file for complete search history.

(56) References Cited

U.S. PATENT DOCUMENTS

| | | | | |
|---|---|---|---|---|
| 8,455,390 | B2* | 6/2013 | Kikuchi | B01D 53/945 502/240 |
| 9,101,914 | B2* | 8/2015 | Ito | B01D 53/945 |
| 9,352,301 | B2* | 5/2016 | Ito | B01D 53/9413 |
| 2004/0038814 | A1* | 2/2004 | Suzuki | B01D 53/945 502/339 |
| 2007/0265160 | A1* | 11/2007 | Kawabata | B01D 53/945 502/303 |
| 2010/0233045 | A1* | 9/2010 | Kim | B01D 53/944 422/177 |

* cited by examiner

EXHAUST GAS PURIFICATION CATALYST

TECHNICAL FIELD

The present invention relates to an exhaust gas purification catalyst and an exhaust gas purification monolith catalyst.

In more detail, the present invention relates to an exhaust gas purification catalyst and an exhaust gas purification monolith catalyst using a hydrogen generating catalyst with high hydrogen generating performance.

BACKGROUND ART

To reduce a burden on the environment, exhaust gas purification catalysts in which a noble metal such as platinum (Pt) is supported by a metal oxide support such as aluminum oxide ($Al_2O_3$) have been widely used for removing harmful substances contained in exhaust gas of internal combustion engines of vehicles such as hydrocarbons (HC), carbon monoxide (CO) and nitrogen oxides ($NO_x$).

In recent years, emission of non-methane organic gas (NMOG) has been strictly regulated among hydrocarbons (HC).

To meet the regulation, an exhaust gas purification device is generally installed in an exhaust system of an internal combustion engine for removing harmful substances in the exhaust gas.

For exhaust gas purification devices, an exhaust gas purification catalyst using a noble metal is typically used. However, since noble metals are expensive, it has been required to reduce the usage of noble metals in terms of cost reduction.

Among noble metals, it has been particularly required to reduce the usage of rhodium (Rh), since rhodium (Rh) is particularly expensive, although it has high purification activity on nitrogen oxides ($NO_x$).

Further, it has been known that exhaust gas purification catalysts that contain aluminum oxide ($Al_2O_3$) or a cerium (Ce)-containing oxide as a main component of a catalyst support degrade with age. For example, rhodium (Rh) forms solid solution with aluminum oxide ($Al_2O_3$), or rhodium (Rh) is covered by the cerium (Ce)-containing oxide.

Since such degradation results in a degradation of the purification performance of the exhaust gas purification catalysts against nitrogen oxides ($NO_x$), it has been required to preliminarily increase the usage of rhodium (Rh) in order to cover the degradation of the performance.

To cope with the problem, a hydrocarbon reforming catalyst has been proposed in which rhodium (Rh) is supported by a complex oxide containing lanthanum (La) and zirconium (Zr) (see Patent Document 1).

CITATION LIST

Patent Literature

Patent Document 1: JP 2002-126522A

SUMMARY OF INVENTION

Technical Problem

However, out of concern over resource depletion, it has been required to further reduce the usage of noble metals. In this regard, the hydrocarbon reforming catalyst described in Patent Document 1 has problems of the insufficient reaction rate at the active sites and the significantly decreased purification efficiency against nitrogen oxides ($NO_x$).

The present invention has been made in view of the above-described problems with the prior art. It is an object of the present invention to provide an exhaust gas purification catalyst and an exhaust gas purification monolith catalyst using a hydrogen generating catalyst with high hydrogen generating performance.

Solution to Problem

The present inventors made a diligent study for achieving the above-described object. As a result, they found that the above-described object can be achieved by including: a first catalyst unit that consists of a predetermined hydrogen generating catalyst; a second catalyst unit that consists of an oxygen storage/release material and a predetermined perovskite oxide disposed in contact with the oxygen storage/release material; and a holding material that holds them in a mutually separated state. The present invention was thus completed.

That is, an exhaust gas purification catalyst of the present invention includes: a first catalyst unit that consists of a hydrogen generating catalyst; a second catalyst unit that consists of an oxygen storage/release material and a perovskite oxide disposed in contact with the oxygen storage/release material; and a holding material that holds the first catalyst unit and the second catalyst unit in a mutually separated state.

The hydrogen generating catalyst consists of a noble metal and an oxide that supports the noble metal, in which the oxide contains lanthanum (La), zirconium (Zr) and at least one additional element selected from the group consisting of neodymium (Nd), samarium (Sm), europium (Eu), magnesium (Mg) and calcium (Ca).

Further, the perovskite oxide is represented by the following general formula (1):

$$La_xM1_{1-x}M2O_{3-\delta} \quad (1)$$

where La is lanthanum, M1 is at least one element selected from the group consisting of barium (Ba), strontium (Sr) and calcium (Ca), M2 is at least one element selected from the group consisting of iron (Fe), cobalt (Co) and manganese (Mn), x satisfies $0<x\leq1$, and $\delta$ satisfies $0\leq\delta\leq1$.

An exhaust gas purification monolith catalyst of the present invention is configured such that a catalyst layer containing the exhaust gas purification catalyst of the present invention is formed in exhaust gas channels of a monolith support.

Advantageous Effects of Invention

According to the present invention, included are: a first catalyst unit that consists of a predetermined hydrogen generating catalyst; a second catalyst unit that consists of an oxygen storage/release material and a predetermined perovskite oxide disposed in contact with the oxygen storage/release material; and a holding material that holds them in a mutually separated state.

With this configuration, it is possible to provide the exhaust gas purification catalyst and the exhaust gas purification monolith catalyst using the hydrogen generating catalyst with high hydrogen generating performance.

DESCRIPTION OF EMBODIMENTS

Hereinafter, an exhaust gas purification catalyst and an exhaust gas purification monolith catalyst using a hydrogen generating catalyst according to an embodiment of the present invention will be described in detail.

First, the hydrogen generating catalyst will be described in detail.

The hydrogen generating catalyst consists of a noble metal and an oxide that supports the noble metal.

The oxide contains lanthanum (La), zirconium (Zr) and at least one additional element (hereinafter also referred to as "M") selected from the group consisting of neodymium (Nd), samarium (Sm), europium (Eu), magnesium (Mg) and calcium (Ca).

As described above, when the noble metal such as platinum (Pt), rhodium (Rh) or palladium (Pd) is supported by the oxide containing lanthanum (La), zirconium (Zr) and the specific additional element (M) such as neodymium (Nd), high hydrogen generating performance is achieved. When this hydrogen generating catalyst is used for an exhaust gas purification catalyst, generated hydrogen ($H_2$) works as a reducing agent of $NO_x$, and the $NO_x$ removal rate can therefore be improved.

The high hydrogen generating performance is considered to be achieved by the following mechanism. When the noble metal such as rhodium (Rh) is supported by the oxide containing lanthanum (La), zirconium (Zr) and the specific additional element (M) such as neodymium (Nd), the specific additional element (M) decreases the binding energy of an electron of the noble metal such as rhodium (Rh) so that the noble metal acts more like a simple metal. As a result, poisoning due to hydrocarbon (HC) adsorption, which causes a degradation of the hydrogen generating performance, is reduced in the steam reforming reaction.

It is considered that the addition of the specific additional element (M) decreases the binding energy of an electron of the noble metal, because, when there is a bond Rh—O-M for example, the M-O bond is stronger between the Rh—O bond and the M-O bond. This means the Rh—O bond is more breakable. As a result, the bonding electrons of the Rh—O bond are not in a covalent state but are deviated toward Rh, and Rh therefore acts more like a simple metal. That is, the state of Rh changes from a metal oxide to a simple metal, i.e. a state having more electrons.

Figure 1:
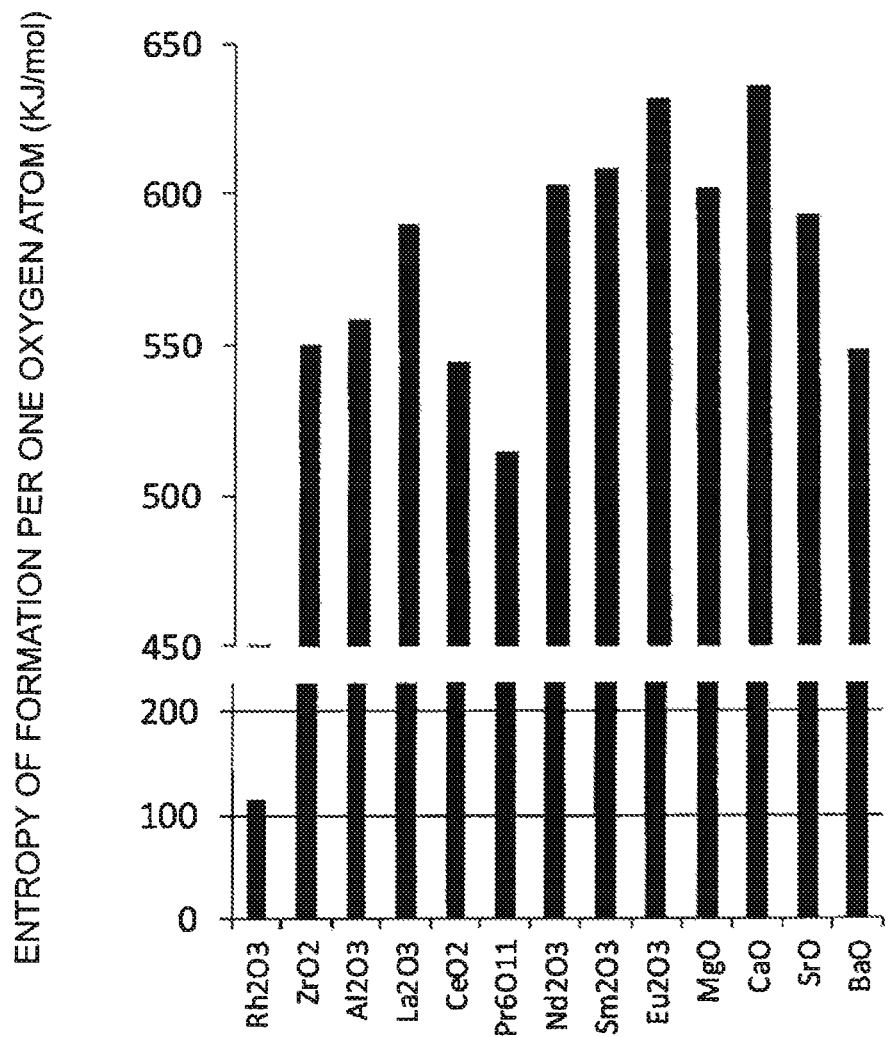
FIG. 1 is a graph illustrating the entropy of formation of various oxides per one oxygen atom.

FIG. 1 is a graph illustrating the entropy of formation of various oxides per one oxygen atom. The values of the entropy of formation of the oxides, from which the equivalents per oxygen atom are calculated, are taken from a chemical handbook. In FIG. 1, a greater value of entropy of formation per one oxygen atom indicates a stronger M-O bond.

As seen in FIG. 1, neodymium oxide ($Nd_2O_3$), samarium oxide ($Sm_2O_3$), europium oxide ($Eu_2O_3$), magnesium oxide (MgO) and calcium oxide (CaO) have a stronger M-O bond than conventional oxides of lanthanum oxide ($La_2O_3$), zirconium oxide ($ZrO_2$) and aluminum oxide ($Al_2O_3$). Accordingly, neodymium (Nd), samarium (Sm), europium (Eu), magnesium (Mg) and calcium (Ca) can be used as the additional element (M). They may be used alone or in combination of two or more.

It is preferred that the oxide of the hydrogen generating catalyst, which contains lanthanum (La), zirconium (Zr) and at least one additional element (M) selected from the group consisting of neodymium (Nd), samarium (Sm), europium (Eu), magnesium (Mg) and calcium (Ca), is a complex oxide.

Figure 2:
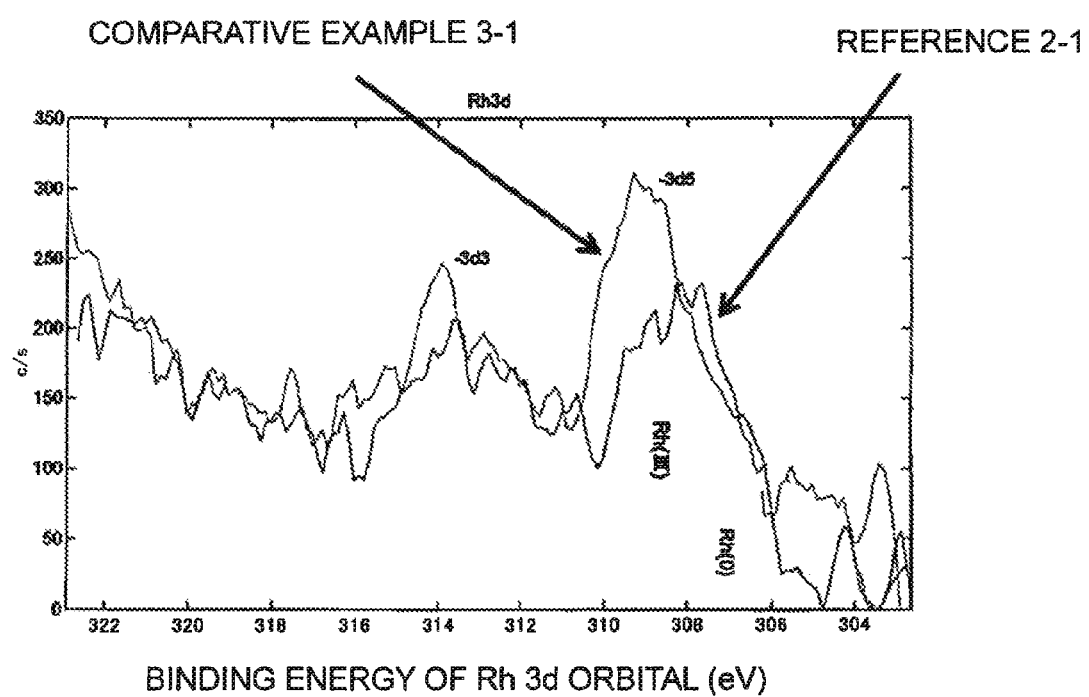
FIG. 2 is a graph illustrating the results of measuring the state of rhodium (Rh) in hydrogen generating catalysts of various examples by X-ray photoelectron spectroscopy (XPS).

FIG. 2 is a graph illustrating the state of rhodium (Rh) in the hydrogen generating catalysts of various examples measured by X-ray photoelectron spectroscopy (XPS). The electron state in the 3d orbital of rhodium (Rh) can be read from FIG. 2. Compared to the hydrogen generating catalyst of Comparative Example 3-1, rhodium (Rh) is shifted to a comparatively low-oxidized state in the hydrogen generating catalyst of Reference 2-1 in which a noble metal such as rhodium (Rh) is supported by a complex oxide containing lanthanum (La), zirconium (Zr) and at least one additional element (M) selected from the group consisting of neodymium (Nd), samarium (Sm), europium (Eu), magnesium (Mg) and calcium (Ca). This means that the state of rhodium (Rh) is changed to a simple metal.

Hydrocarbons (HC) easily adsorb on noble metals such as rhodium that are shifted to a highly oxidized state due to the π electrons of the hydrocarbons (HC) themselves, and a steam reforming reaction tends to be thereby inhibited. However, by adding the specific additional element (M) such neodymium (Nd), rhodium (Rh) acts like a simple metal. Accordingly, poisoning due to such adsorbed hydrocarbons (HC) is reduced, and the activity of the steam reforming reaction is less likely to be decreased. As a result, the catalyst exhibits high hydrogen generating performance.

Figure 3:
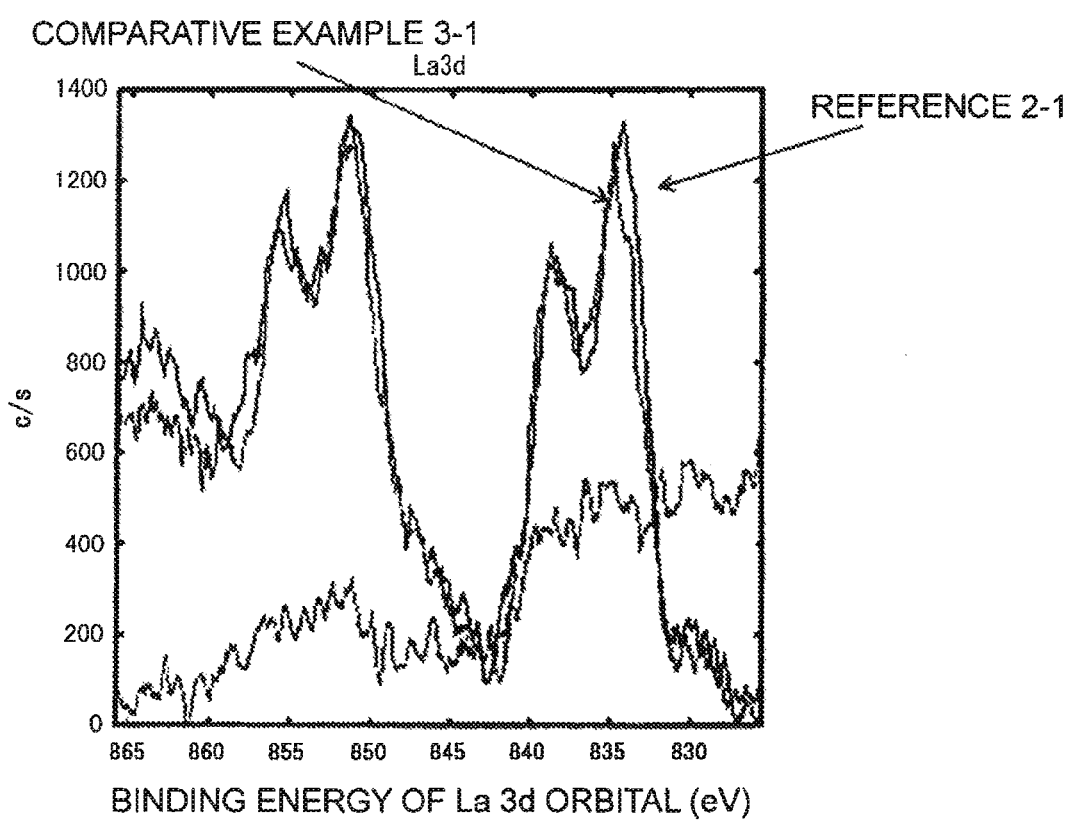
FIG. 3 is a graph illustrating the results of measuring the state of lanthanum (La) in hydrogen generating catalysts of various examples by X-ray photoelectron spectroscopy (XPS).

FIG. 3 is a graph illustrating the state of lanthanum (La) in the hydrogen generating catalysts of various examples measured by X-ray photoelectron spectroscopy (XPS). The electron state in the 3d orbital of lanthanum (La) can be read from FIG. 3. Compared to the hydrogen generating catalyst of Comparative Example 3-1, lanthanum (La) is shifted to a comparatively low-oxidized state in the hydrogen generating catalyst of Reference 2-1 in which a noble metal such as rhodium (Rh) is supported by a complex oxide containing lanthanum (La), zirconium (Zr) and at least one additional element selected from the group consisting of neodymium (Nd), samarium (Sm), europium (Eu), magnesium (Mg) and calcium (Ca).

Figure 4:
FIG. 4 is an explanatory view illustrating a mechanism of promoting absorption of water ($H_2O$) to an oxide containing lanthanum (La), zirconium (Zr) and neodymium (Nd).

FIG. 4 illustrates an explanatory view illustrating a mechanism of promoting adsorption of water ($H_2O$) to the oxide containing lanthanum (La), zirconium (Zr) and neodymium (Nd). As illustrated FIG. 4, the electron state of lanthanum (La) can be changed by adding a specific additional element (M) such as neodymium (Nd), since the M-O bond is stronger than La—O bond. As a result, the hydrogen bond between the hydroxyl group (OH) in the surface and the water ($H_2O$) becomes stronger, and adsorption of water ($H_2O$) is promoted accordingly.

First Embodiment

Next, an exhaust gas purification catalyst according to a first embodiment of the present invention will be described in detail.

The exhaust gas purification catalyst of the embodiment includes a first catalyst unit that consists of a hydrogen generating catalyst, a second catalyst unit that consists of an oxygen storage/release material and a perovskite oxide disposed in contact with the oxygen storage/release material, and a holding material that holds the first catalyst unit and the second catalyst unit in a mutually separated state.

The hydrogen generating catalyst includes a noble metal and an oxide that supports the noble metal, in which the oxide contains lanthanum (La), zirconium (Zr) and at least one additional element selected from the group consisting of neodymium (Nd), samarium (Sm), europium (Eu), magnesium (Mg) and calcium (Ca).

Further, the perovskite oxide is represented by the following general formula (1):

$$La_xM1_{1-x}M2O_{3-\delta} \qquad (1)$$

where La is lanthanum, M1 is at least one element selected from the group consisting of barium (Ba), strontium (Sr) and calcium (Ca), M2 is at least one element selected from the group consisting of iron (Fe), cobalt (Co) and manganese (Mn), x satisfies $0<x\leq1$, and $\delta$ satisfies $0\leq\delta\leq1$.

With this configuration, the exhaust gas purification catalyst exhibits high purification performance against hydrocarbons (HC) including non-methane organic gas (NMOG), nitrogen oxides ($NO_x$) and the like due to the hydrogen generating catalyst with high hydrogen generating performance as described above. Further, it also exhibits good purification performance against carbon monoxide (CO).

Since the predetermined first catalyst unit and the second catalyst unit are included in a mutually separated state, the degradation due to thermal aggregation and the like does not proceed. In contrast, when the first catalyst unit comes in contact with the perovskite oxide of the second catalyst unit, aggregation of the oxide that supports the noble metal in the first catalyst unit is promoted. As a result, aggregation of the noble metal is promoted.

Further, since the first catalyst unit is the oxide that contains the above-described specific additional element (M), poisoning due to hydrocarbon (HC) adsorption, which causes a degradation of the hydrogen generating performance, is reduced in the steam reforming reaction. Therefore, the high hydrogen generating performance is achieved.

Furthermore, since the second catalyst unit is configured such that the oxygen storage/release material that releases oxygen under a rich atmosphere is disposed in contact with the perovskite oxide, oxygen is supplied from the oxygen storage/release material even under a reducing atmosphere. Therefore, dissociation of oxygen from the perovskite structure and the resultant collapse of the structure are prevented. As a result, the catalyst performance can be maintained. When an oxide that contains a non-perovskite transition metal element is used, the oxide reacts with the holding material, and the catalyst performance is therefore degraded.

Also in the exhaust gas purification catalyst of this embodiment, it is preferred that the oxide that contains lanthanum (La), zirconium (Zr) and at least one additional element selected from the group consisting of neodymium (Nd), samarium (Sm), europium (Eu), magnesium (Mg) and calcium (Ca) is a complex oxide in terms of further improving the purification performance against hydrocarbons (HC) including non-methane organic gas (NMOG), carbon monoxide (CO), nitrogen oxides ($NO_x$) and the like.

Further, in the exhaust gas purification catalyst of this embodiment, it is preferred that the M2 content of the perovskite oxide is equal to or less than 15 mass %. The second catalyst unit has a function as active sites as well as the oxygen storing/releasing function. In particular, the oxidizing function is improved with an increase of the amount of transition metal element (element M2 in the perovskite) added. However, once the amount of transition metal element reaches a certain level, the improving effect becomes small due to saturation. It is considered this is because such increase of the content does not increase the surface that contributes to the activity but causes aggregation of the perovskite oxide. Further, such increase may possibly obstruct micro pores of the second catalyst unit and thus decreases the gas diffusion property.

In the exhaust gas purification catalyst of this embodiment, it is preferred that micro pores with a pore size of from 0.1 μm to 1 μm has a pore volume of from 0.04 $cm^3$/g to 0.07 $cm^3$/g.

When the pore volume is within this range, the performance can be further improved. To improve the exhaust gas purification performance, it is desirable to effectively use the active sites in the catalyst. For this reason, it is required to ensure channels that diffuse exhaust gas. When the pore volume of the catalyst is within the above pore volume range, the gas diffusion property is improved, and the purification performance is therefore improved. When the pore volume is below the above pore volume range, the gas diffusion property is decreased, and the contact frequency between the active sites and gas is decreased accordingly. This may cause a degradation of the purification performance. When the pore volume is over the above pore volume range, the catalyst coating layer may come off more often due to too many micro pores in the catalyst coating layer, which may cause a degradation of the purification performance.

In the exhaust gas purification catalyst of the embodiment, it is preferred that the average secondary particle size of the hydrogen generating catalyst is equal to or less than 300 nm.

When the average secondary particle size is within this range, the exhaust gas purification performance can be further improved. Further, when the average secondary particle size is within this range, the noble metal such as rhodium (Rh) can be prevented from particle growth due to aggregation.

In the exhaust gas purification catalyst of this embodiment, it is preferred that the average particle size is equal to or less than 6 μm.

When the average particle size is within this range, the exhaust gas purification performance can be further improved. When the average particle size is greater than 6 μm, the catalyst coating may come off more often due to the increased gap between the particles, which may cause a degradation of the purification performance. Further, when a monolith support is coated with the catalyst, such particle size may cause unevenness of the catalyst coating layer.

In the exhaust gas purification catalyst of this embodiment, it is preferred that the oxygen storage/release material contains cerium (Ce) and zirconium (Zr).

The oxygen storage capability is based on a phenomenon that an element such as cerium (Ce) changes its valence according to a change in the atmosphere. Accordingly, it is essential that oxygen storage/release material contains an element that changes its valence according to a change in the atmosphere. Among such elements, cerium (Ce) provides the maximum oxygen storage capability. When cerium (Ce) is solely used, it may aggregate due to heat under exhaust gas atmosphere, and the oxygen storage capability may therefore be decreased. To avoid this, it is preferred to improve the heat resistance. By forming a complex with zirconium (Zr), it is possible to prevent such aggregation and thus to always maintain the oxygen storage capability under exhaust gas atmosphere.

In the exhaust gas purification catalyst of this embodiment, the noble metal is preferably rhodium (Rh), and the additional element is preferably neodymium (Nd). The second catalyst unit using the perovskite oxide is inferior to the noble metal in reduction performance although it has high oxidation performance. By combining it with rhodium (Rh), which is a noble metal with high reduction performance, it is possible to improve the performance as a three-way catalyst.

To effectively utilize a minute amount of the noble metal, it is preferred to prevent aggregation of the noble metal such as rhodium (Rh). For example, aggregation of rhodium (Rh) is promoted by sintering due to heat under exhaust gas atmosphere. By disposing neodymium (Nd) that forms a chemical bond with rhodium (Rh) in the oxide (anchor material) that supports rhodium (Rh), it is possible to prevent rhodium (Rh) from aggregation due to heat. Further, along with aggregation of the oxide that contains lanthanum (La), zirconium (Zr) and the specific additional element such as neodymium (Nd), rhodium (Rh) may aggregate or be buried in the oxide, which may cause a degradation of the purification performance. Accordingly, it is also preferred to prevent aggregation of zirconium (Zr) itself due to heat in terms of preventing a degradation of the performance of rhodium (Rh), which is achieved by using the oxide containing lanthanum (La), zirconium (Zr) and the neodymium (Nd) specific additional element that is formed by adding lanthanum (La) and neodymium (Nd) to a zirconium (Zr)-based oxide.

In the exhaust gas purification catalyst of this embodiment, it is preferred that the holding material contains aluminum (Al) and lanthanum (La).

By using the holding material that contains lanthanum (La)-doped aluminum oxide, it is possible to reduce or prevent contact between the first catalyst unit and the second catalyst unit without decreasing the gas diffusion property.

It is preferred that the holding material has sufficient channels through which exhaust gas can flow in addition to the function of preventing a contact between the first catalyst unit and the second catalyst unit. A suitable example of such holding materials that fulfill the requirements is aluminum oxide ($Al_2O_3$). Since aluminum oxide ($Al_2O_3$) has many micro pores, it is effective for ensuring exhaust gas channels. However, it tends to aggregate due to heat under exhaust gas atmosphere and thus lose some micro pores. By adding a minute amount of lanthanum (La) in aluminum oxide ($Al_2O_3$), it is possible to reduce aggregation of the aluminum oxide ($Al_2O_3$) so as to maintain required micro pores even under high temperature atmosphere.

Second Embodiment

Next, an exhaust gas purification monolith catalyst according to a second embodiment of the present invention will be described in detail referring to the drawings.

Figure 5A:
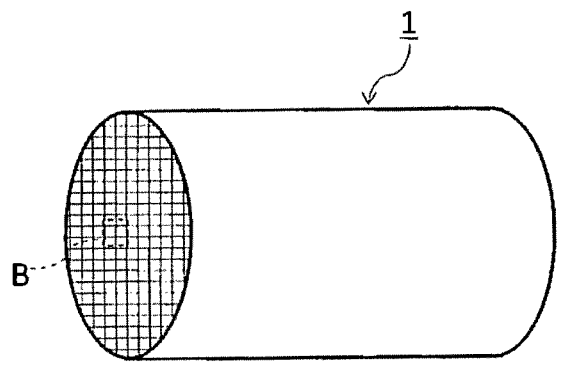
FIG. 5A, FIG. 5B, FIG. 5C and FIG. 5D are explanatory views of an exhaust gas purification monolith catalyst according to a second embodiment of the present invention.
Figure 5B:
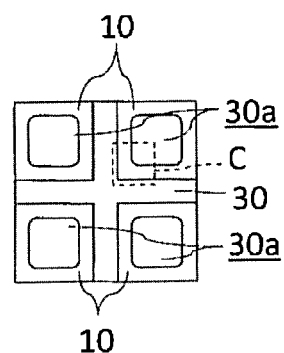
Figure 5C:
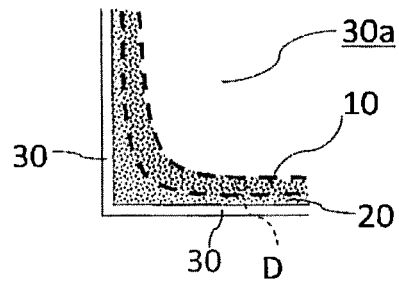
Figure 5D:
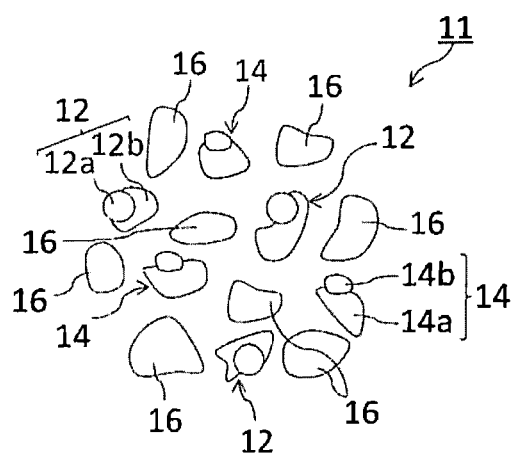

FIG. 5A, FIG. 5B, FIG. 5C and FIG. 5D are explanatory views illustrating the exhaust gas purification monolith catalyst according to the second embodiment. FIG. 5A is a perspective view of the exhaust gas purification monolith catalyst of this embodiment. FIG. 5B is a schematic front view of the part of the exhaust gas purification monolith catalyst surrounded by the envelop line B in FIG. 5A. FIG. 5C is a schematic enlargement of the part of the exhaust gas purification monolith catalyst surrounded by the envelop line C in FIG. 5B. FIG. 5D is a schematic enlargement of the part of the exhaust gas purification monolith catalyst surrounded by the envelop line D in FIG. 5C. As illustrated in FIG. 5A to FIG. 5C, the exhaust gas purification monolith catalyst 1 of this embodiment is configured such that a catalyst layer 10 that contains the above-described exhaust gas purification catalyst of the first embodiment is formed in exhaust gas channels 30a of a monolith support 30. Further, an undercoat layer 20 is formed in this embodiment, which is described below. As illustrated in FIG. 5D, the exhaust gas purification catalyst 11 of this embodiment includes a first catalyst unit 12 that consists of a hydrogen generating catalyst, a second catalyst unit 14 that consists of an oxygen storage/release material 14a and an above-described predetermined perovskite oxide 14a disposed in contact with the oxygen storage/release material 14a, and a holding material 16 that holds the first catalyst unit 12 and the second catalyst unit 14 in a mutually separated state.

The hydrogen generating catalyst 12 consists of the above-described noble metal 12a and a specific oxide 12b that supports the noble metal 12a.

The monolith support 30 may be constituted by a honeycomb support that is made of a heat-resistant material, such as ceramics like cordierite or metal like ferrite stainless steel, or the like.

With this configuration, it is possible to improve the contact between the exhaust gas purification catalyst and exhaust gas and thus to further improve the catalyst performance.

As illustrated in FIG. 5C, the exhaust gas purification monolith catalyst of this embodiment includes the undercoat layer that contains a heat-resistant inorganic oxide and is disposed at the lowermost layer of the catalyst layer.

As described above, the catalyst layer formed by coating the monolith support with the exhaust gas purification catalyst can improve the contact between the exhaust gas purification catalyst and exhaust gas and thereby further improve the catalyst performance. However, when the monolith support is coated with the exhaust gas purification catalyst, the catalyst is accumulated at corners of the honeycomb support so that the coating layer becomes partly thick. Since exhaust gas diffuses less in such a thick coating layer, the catalyst located in the corners is not utilized for the exhaust gas purification. To avoid this, the undercoat layer is provided to eliminate the corners of the honeycomb support. This can reduce the amount of exhaust gas purification catalyst that is disposed in the part where there is less contact between the exhaust gas purification catalyst and exhaust gas.

EXAMPLES

Hereinafter, the present invention will be described in more detail with examples.
(Reference 1-1)

Three mass % lanthanum oxide ($La_2O_3$)-5 mass % neodymium oxide ($Nd_2O_3$)-zirconium oxide ($ZrO_2$) (hereinafter the "lanthanum oxide ($La_2O_3$)-neodymium oxide ($Nd_2O_3$)- zirconium oxide ($ZrO_2$)" is also referred to as a "Zr—La—Nd oxide.") was impregnated with a hexarhodium salt by the incipient wetness method. Then, the oxide was dried at 150° C. for 12 hours. Thereafter, the oxide was baked at 400° C. for 1 hour. A first catalyst unit (powder) was thus obtained. The concentration of the supported rhodium (Rh) in the first catalyst unit of the reference was 0.092 mass %. Then, 20 mass % cerium oxide ($CeO_2$)-10 mass % neodymium oxide ($Nd_2O_3$)-zirconium oxide ($ZrO_2$) (hereinafter the "cerium oxide ($CeO_2$)-neodymium oxide ($Nd_2O_3$)-zirconium oxide ($ZrO_2$)" is also referred to as a "Zr—Ce—Nd oxide.") was impregnated with aqueous solution of a lanthanum (La) salt, a strontium (Sr) salt and an iron (Fe) salt. Then, the oxide was dried at 150° C. for 12 hours. Thereafter, the oxide was (Test Conditions)

Sample weight: 0.2 g

Figure 6:
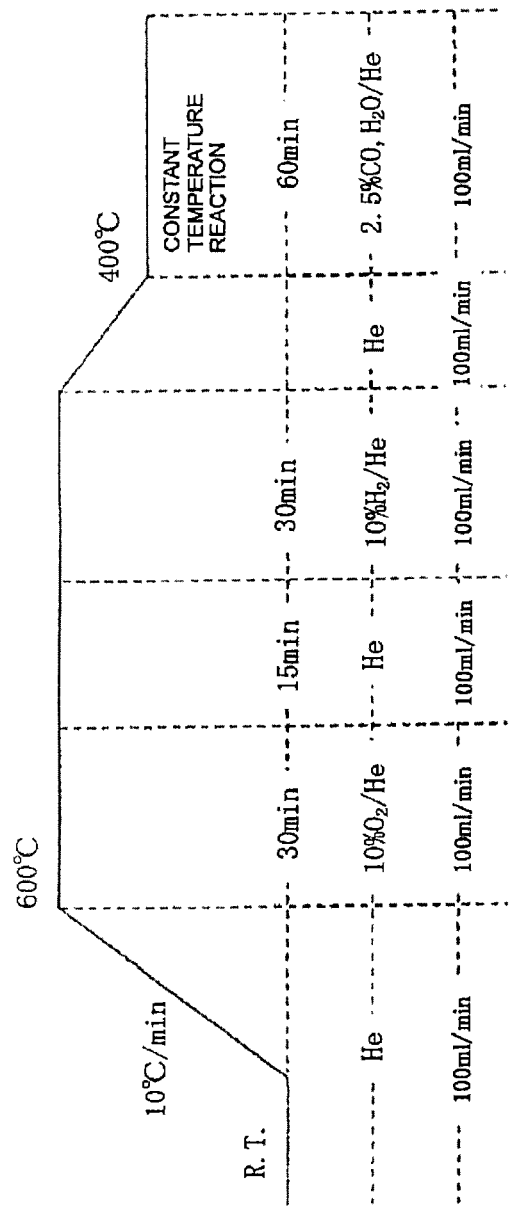
FIG. 6 is an explanatory view illustrating a measuring program for a carbon monoxide shift reaction test.

Measuring conditions: according to the measuring program illustrated in FIG. 6

Temperature-programmed reduction measurement: The gas component was detected by a quadrupole mass spectrometer.

Detection fragments: m/z=2, 18, 28, 44

Measuring temperature: 400° C.

Measuring atmosphere: 2.5 vol % CO, $H_2O$/He (introduced by bubbling at room temperature)

Flow rate: 100 ml/min

TABLE 1

| | First Catalyst Unit | | Second Catalyst Unit (Oxygen Storage/Release Material) | | Hydrogen ($H_2$) Generating |
|---|---|---|---|---|---|
| | Noble Metal | Oxide | Perovskite Oxide | Cerium-Containing Oxide | Rate ($\mu mol/s \cdot g\_cat$) |
| Reference 1-1 | Rh | 3 mass % $La_2O_3$—5 mass % $Nd_2O_3$—$ZrO_2$ | $La_{0.8}Sr_{0.2}FeO_3$ | 20 mass % $CeO_2$—10 mass % $Nd_2O_3$—$ZrO_2$ | 6.71 |
| Comparative Example 1-1 | Rh | 3 mass % $La_2O_3$—5 mass % $Nd_2O_3$—$ZrO_2$ | — | — | 3.88 |
| Comparative Example 1-2 | — | — | $La_{0.8}Sr_{0.2}FeO_3$ | 20 mass % $CeO_2$—10 mass % $Nd_2O_3$—$ZrO_2$ | 0.14 |
| Comparative Example 1-3 | Rh | 3 mass % $La_2O_3$—$ZrO_2$ | — | — | 3.50 | baked at 400° C. for 2 hour and then at 700° C. for 5 hours. A second catalyst unit (powder) was thus obtained.

Thereafter, the first catalyst unit and the second catalyst unit were weighed in a weight ratio of the first catalyst unit:the second catalyst unit=5:2, and they were mixed in a crucible for 5 minutes. A hydrogen generating catalyst of the reference was thus obtained.

Comparative Example 1-1

The first catalyst unit of Reference 1-1 was used as a hydrogen generating catalyst of the Comparative Example.

Comparative Example 1-2

The second catalyst unit of Reference 1-1 was used as a hydrogen generating catalyst of the Comparative Example.

Comparative Example 1-3

Three mass % lanthanum oxide ($La_2O_3$)-zirconium oxide ($ZrO_2$) (hereinafter the "lanthanum oxide ($La_2O_3$)-zirconium oxide ($ZrO_2$)" is also referred to as a "Zr—La oxide.") was impregnated with a hexarhodium salt by the incipient wetness method. Then, the oxide was dried at 150° C. for 12 hours. Thereafter, the oxide was baked at 400° C. for 1 hour. A first catalyst unit (powder) was thus obtained. The concentration of the supported rhodium (Rh) in the first catalyst unit of the Comparative Example 1-3 is 0.092 mass %.

The first catalyst unit was used as a hydrogen generating catalyst of the Comparative Example.

(Performance Evaluation)
(Hydrogen Generating Performance Test)

A carbon monoxide shift reaction test was conducted in the following conditions for the hydrogen generating catalysts (powder) of the above-described examples. The results are shown in Table 1.

As seen in Table 1, Reference 1-1 exhibited faster hydrogen generating rate than Comparative Example 1-1 to Comparative Example 1-3, which means the carbon monoxide shift reaction effectively proceeded in Reference 1-1. Further, Reference 1-1 produced hydrogen more than the sum of Comparative Example 1-1 and Comparative Example 1-2.

Example 1-1

(1) The Zr—La—Nd oxide was impregnated with rhodium (Rh) in a predetermined amount. Then, the oxide was dried and baked so that a Rh/Zr—La—Nd oxide powder was obtained. Then, pure water was added to the powder to a solid content of 40 mass %, and the powder was grinded. A slurry containing a first catalyst unit was thus obtained.

(2) The Zr—Ce—Nd oxide was impregnated with $LaSrFeO_3$ in a predetermined amount so that the iron (Fe) content became 5 mass %. Then, the oxide was dried and baked so that $LaSrFeO_3$/Zr—Ce—Nd oxide powder was obtained. Then, pure water is added to the powder to a solid content of 40 mass %, and the powder was grinded. A slurry containing a second catalyst unit was thus obtained.

(3) The above-described slurries of steps (1) and (2) and boehmite were mixed in a predetermined amount so that a mixture slurry was obtained. Then, the mixture slurry was dried, and the dried mixture was baked at 550° C. for 3 hours. A powder containing the first catalyst unit and the second catalyst unit was thus obtained. The concentration of the supported rhodium (Rh) in the first catalyst unit of the example was 0.092 mass %.

Example 1-2

(1) The Zr—La—Nd oxide was impregnated with rhodium (Rh) in a predetermined amount. Then, the oxide was dried and baked so that a Rh/Zr—La—Nd oxide powder was obtained. Then, pure water was added to the powder to a solid content of 40 mass %, and the powder was grinded. A slurry containing the first catalyst unit was thus obtained.

(2) The Zr—Ce—Nd oxide was impregnated with LaSrFeO$_3$ in a predetermined amount so that the iron (Fe) content became 5 mass %. Then, the oxide was dried and baked so that a LaSrFeO$_3$/Zr—Ce—Nd oxide powder was obtained. Then, pure water was added to the powder to a solid content of 40 mass %, and the powder was grinded. A slurry containing a second catalyst unit was thus obtained.

(3) The above-described slurries of steps (1) and (2) and boehmite were mixed in a predetermined amount so that a mixture slurry was obtained. Then, the mixture slurry was dried, and the dried mixture was baked at 550° C. for 3 hours. A surface layer powder was thus obtained.

(4) The above-described powder of step (3), a binder, nitric acid and pure water were charged into a ceramic pot, and the mixture was grinded by shaking with alumina balls. A surface layer slurry was thus obtained.

(5) Aluminum oxide (Al$_2$O$_3$), a binder, nitric acid and pure water were charged into a ceramic pot, and the mixture was grinded by shaking with alumina balls. An inner layer slurry was thus obtained.

(6) The above-described inner layer slurry of step (5) was charged into a honeycomb support, and excess inner layer slurry was removed by means of air flow. Then, the support was dried at 120° C. The amount of coating was 113 g/L.

(7) The above-described surface layer slurry of step (4) was charged into the above-described support of step (6), and excess surface layer slurry was removed by means of air flow. Then, the support was dried at 120° C. Thereafter, the support was baked at 400° C. under air flow. An exhaust gas purification monolith catalyst of the example was thus obtained. The amount of coating was 124 g/L. The content of rhodium (Rh) in the exhaust gas purification monolith catalyst was 0.03 g/L.

Example 1-3

An exhaust gas purification monolith catalyst of the example was obtained by repeating the same process as in Example 1-2 except that the M2 element is changed from iron (Fe) to cobalt (Co).

Example 1-4

An exhaust gas purification monolith catalyst of the example was obtained by repeating the same process as in Example 1-2 except that the M2 element is changed from iron (Fe) to manganese (Mn).

Comparative Example 2-1

(1) The Zr—La—Nd oxide was impregnated with rhodium (Rh) in a predetermined amount. Then, the oxide was dried and baked so that a Rh/Zr—La—Nd oxide powder was obtained. Then, pure water was added to the powder to a solid content of 40 mass %, and the powder was grinded. A slurry containing a first catalyst unit was thus obtained.

(2) Pure water was added to the Zr—Ce—Nd oxide powder to a solid content of 40 mass %, and the powder was grinded. A slurry containing a second catalyst unit was thus obtained.

(3) The above-described slurries of steps (1) and (2) and boehmite were mixed in a predetermined amount so that a mixture slurry was obtained. Then, the mixture slurry was dried, and the dried mixture was baked at 550° C. for 3 hours. A powder containing the first catalyst unit and the second catalyst unit was thus obtained. The concentration of the supported rhodium (Rh) in the first catalyst unit of the example was 0.092 mass %.

Comparative Example 2-2

(1) The Zr—La—Nd oxide was impregnated with rhodium (Rh) in a predetermined amount. Then, the oxide was dried and baked so that a Rh/Zr—La—Nd oxide powder was obtained. Then, pure water was added to the powder to a solid content of 40 mass %, and the powder was grinded. A slurry containing a first catalyst unit was thus obtained.

(2) Pure water was added to the Zr—Ce—Nd oxide powder to a solid content of 40 mass %, and the powder was grinded. A slurry containing a second catalyst unit was thus obtained.

(3) The above-described slurries of steps (1) and (2) and boehmite were mixed in a predetermined amount so that a mixture slurry was obtained. Then, the mixture slurry was dried, and the dried mixture was baked at 550° C. for 3 hours, so that a surface layer powder was obtained.

A binder, nitric acid and pure water were charged into a ceramic pot, and the mixture was grinded by shaking with alumina balls. A surface layer slurry was thus obtained.

(4) The above-described powder of step (3), a binder, nitric acid and pure water were charged into a ceramic pot, and the mixture was grinded by shaking with alumina balls. A surface layer slurry was thus obtained.

(5) Aluminum oxide (Al$_2$O$_3$), a binder, nitric acid and pure water were charged into a ceramic pot, and the mixture was grinded by shaking with alumina balls. An inner layer slurry was thus obtained.

(6) The above-described inner layer slurry of step (5) was charged into a ceramic honeycomb support, and excess inner layer slurry was removed by means of air flow. Then, the support was dried at 120° C. The amount of coating was 113 g/L.

(7) The above-described surface layer slurry of step (4) was charged into the above-described support of step (6), and excess surface layer slurry was removed by means of air flow. Then, the support was dried at 120° C. Thereafter, the support was baked at 400° C. under air flow. An exhaust gas purification monolith catalyst of the Comparative Example was thus obtained. The amount of coating was 124 g/L. Further, the content of rhodium (Rh) in the exhaust gas purification monolith catalyst was 0.03 g/L.

Comparative Example 2-3

(1) The Zr—La—Nd oxide was impregnated with rhodium (Rh) in a predetermined amount.

Then, the oxide was dried and baked so that a Rh/Zr—La—Nd oxide powder was obtained. Then, pure water was added to the powder to a solid content of 40 mass %, and the powder was grinded. A slurry containing a first catalyst unit was thus obtained.

(2) The Zr—Ce oxide was impregnated with FeO$_2$ in a predetermined amount so that the iron (Fe) content became 5 mass %. Then, the oxide was dried and baked so that a FeO$_2$/Zr—Ce oxide powder was obtained. Then, pure water was added to the powder to a solid content of 40 mass %, and the powder was grinded. A slurry containing a second catalyst unit was thus obtained.

(3) The above-described slurries of steps (1) and (2) and boehmite were mixed in a predetermined amount so that a mixture slurry was obtained. Then, the mixture slurry was dried, and the dried mixture was baked at 550° C. for 3 hours. A surface layer powder was thus obtained.

(4) The above-described powder of step (3), a binder, nitric acid and pure water were charged into a ceramic pot, and the mixture was grinded by shaking with alumina balls. A surface layer slurry was thus obtained.
(5) Aluminum oxide ($Al_2O_3$), a binder, nitric acid and pure water were charged into a ceramic pot, and the mixture was grinded by shaking with alumina balls. An inner layer slurry was thus obtained.
(6) The above-described inner layer slurry of step (5) was charged into a honeycomb support, and excess inner layer slurry was removed by means of air flow. Then, the support was dried at 120° C. The amount of coating was 113 g/L.
(7) The above-described surface layer slurry of step (4) was charged into the above-described support of step (6), and excess surface layer slurry was removed by means of air flow. Then, the support was dried at 120° C. Thereafter, the support was baked at 400° C. under air flow. An exhaust gas purification monolith catalyst of the Comparative Example was thus obtained. The amount of coating was 124 g/L. The content of rhodium (Rh) in the exhaust gas purification monolith catalyst was 0.03 g/L. The specification of the examples is partly shown in Table 2.

Figure 7:
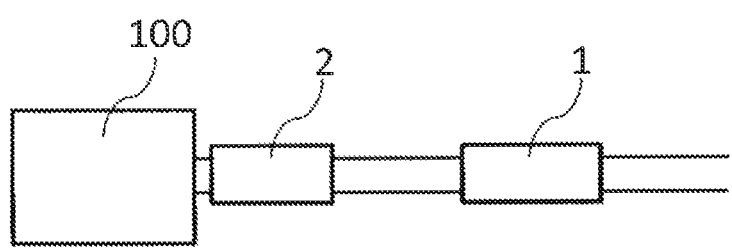
FIG. 7 is an explanatory view of a catalyst arrangement in an $NO_x$ emission measurement or an HC emission measurement.

(Performance Evaluation)
(Hydrogen Generating Performance Test)
A carbon monoxide shift reaction test was conducted for the catalysts (powder) of the above-described Embodiment 1-1 and Comparative Example 2-1 in the following condition. The results are shown in Table 2.
(Test Conditions)
Sample weight: 0.2 g
Measuring conditions: according to the measuring program illustrated in FIG. 6
Temperature-programmed reduction measurement: The gas component was detected by a quadrupole mass spectrometer.
Detection fragments: m/z=2, 18, 28, 44
Measuring temperature: 400° C.
Measuring atmosphere: 2.5 vol % CO, $H_2O$/He (introduced by bubbling at room temperature)
Flow rate: 100 ml/min
($NO_x$ Emission Measurement)
FIG. 7 is an explanatory view illustrating an arrangement of the catalyst in the $NO_x$ emission measurement. As illustrated in FIG. 7, a three-way catalyst 2 was disposed directly below a 1.5 L displacement engine 100 of a vehicle produced by Nissan Motor Co., Ltd (i.e. in a manifold of the engine), and an exhaust gas purification monolith catalyst 1 of Example 1-2 to Example 1-4, Comparative Example 2-2 or Comparative Example 2-3 that has been subjected to the endurance treatment described below was disposed in the downstream thereof. The vehicle was run in the NEDC mode (cold start), and the $NO_x$ emission was measured for the exhaust gas purification monolith catalyst of each example. The results are shown in Table 2.

(Endurance Conditions)
A catalyst was disposed to the rear of a V type-6 cylindered 3.5 L engine produced by Nissan Motor Co., Ltd. The temperature at the catalyst inlet was adjusted to 840° C., and the catalyst was placed under an exhaust gas atmosphere for 250 hours. The catalyst was thus subjected to an endurance treatment. The fuel used was lead free gasoline.

TABLE 2

|  | Noble Metal Content | Oxide | Perovskite Oxide | Cerium-Containing Oxide | Hydrogen ($H_2$) Generation (μmol/g) | $NO_x$ Emission (g/test) |
|---|---|---|---|---|---|---|
| Example 1-1 | 0.092 mass % | Zr—La—Nd Oxide | $LaSrFeO_3$ | Ce—Nd—$ZrO_2$ | 6.0 | — |
| Example 1-2 | 0.03 g/L | Zr—La—Nd Oxide | $LaSrFeO_3$ | Ce—Nd—$ZrO_2$ | — | 0.219 |
| Example 1-3 | 0.03 g/L | Zr—La—Nd Oxide | $LaSrCoO_3$ | Ce—Nd—$ZrO_2$ | — | 0.232 |
| Example 1-4 | 0.03 g/L | Zr—La—Nd Oxide | $LaSrMnO_3$ | Ce—Nd—$ZrO_2$ | — | 0.224 |
| Comparative Example 2-1 | 0.092 mass % | Zr—La—Nd Oxide | — | Ce—Nd—$ZrO_2$ | 3.5 | — |
| Comparative Example 2-2 | 0.03 g/L | Zr—La—Nd Oxide | — | Ce—Nd—$ZrO_2$ | — | 0.247 |
| Comparative Example 2-3 | 0.03 g/L | Zr—La—Nd Oxide | $FeO_2$ | Ce—$ZrO_2$ | — | 0.233 |

As seen in Table 2, an inventive Example 1-1 exhibited higher hydrogen generation than a non-inventive Comparative Example 2-1. This means the carbon monoxide shift reaction proceeds more effectively in Example 1-1.
Further, as seen in Table 2, inventive Example 1-2 to Example 1-4 exhibited lower $NO_x$ emission compared to non-inventive Comparative Example 2-2 and Comparative Example 2-3.

(Reference 2-1)
Three mass % lanthanum oxide ($La_2O_3$)-5 mass % neodymium oxide ($Nd_2O_3$)-zirconium oxide ($ZrO_2$) (hereinafter the "lanthanum oxide ($La_2O_3$)-neodymium oxide ($Nd_2O_3$)-zirconium oxide ($ZrO_2$)" is also simply referred to as a "Zr—La—Nd oxide.") was impregnated with a hexarhodium salt by the incipient wetness method. Then, the oxide was dried at 150° C. for 12 hours. Thereafter, the oxide was baked at 400° C. for 1 hour. A hydrogen generating catalyst of the reference was thus obtained. The concentration of the supported rhodium (Rh) in the hydrogen generating catalyst of the reference was 0.092 mass %.

Comparative Example 3-1

Three mass % lanthanum oxide ($La_2O_3$)-zirconium oxide ($ZrO_2$) (hereinafter the "lanthanum oxide ($La_2O_3$)-zirconium oxide ($ZrO_2$)" is also simply referred to as a "Zr—La oxide.") was impregnated with a hexarhodium salt by the incipient wetness method. Then, the oxide was dried at 150° C. for 12 hours. Thereafter, the oxide was baked at 400° C. for 1 hour. A hydrogen generating catalyst of the Comparative Example was thus obtained. The concentration of the supported rhodium (Rh) in the hydrogen generating catalyst of the Comparative Example was 0.092 mass %.

Comparative Example 3-2

Ten mass % lanthanum oxide ($La_2O_3$)-aluminum oxide ($Al_2O_3$) was impregnated with a hexarhodium salt by the incipient wetness method. Then, the oxide was dried at 150° C. for 12 hours. Thereafter, the oxide was baked at 400° C. for 1 hour. A hydrogen generating catalyst of the Comparative Example was thus obtained. The concentration of the supported rhodium (Rh) in the hydrogen generating catalyst of the Comparative Example was 0.092 mass %.

(Performance Evaluation)
(Hydrogen Generating Performance Test)

A steam reforming reaction test was conducted for the hydrogen generating catalysts (powder) of the above-described examples in the following conditions. The results are shown in Table 3.

Figure 8:
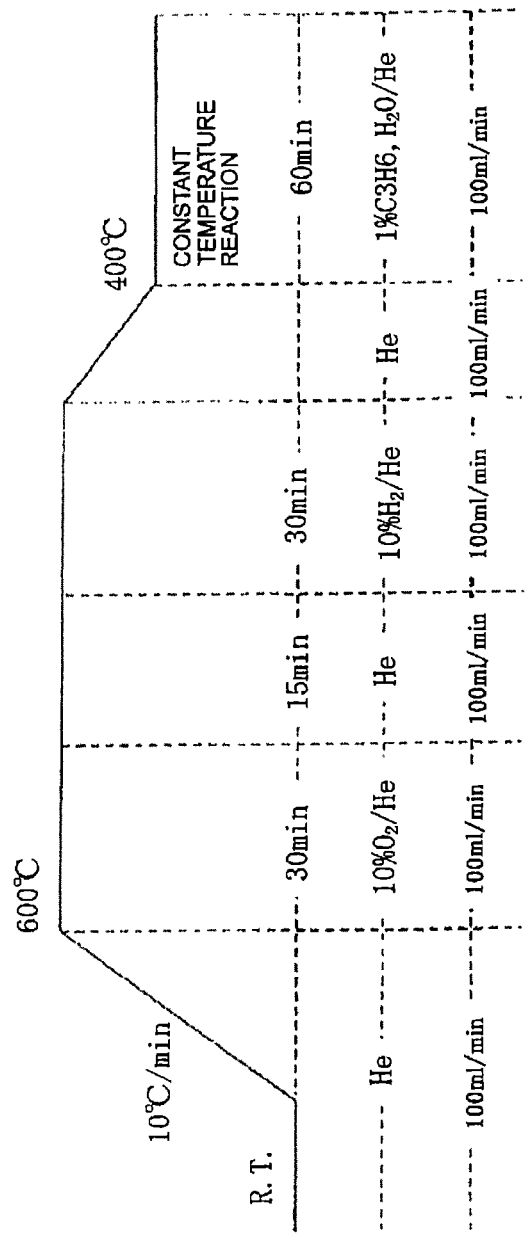
FIG. 8 is an explanatory view illustrating a measuring program for a steam reforming reaction test.

(Test Conditions)
Sample weight: 0.2 g
Measuring conditions: according to the measuring program illustrated in FIG. 8
Temperature-programmed reduction measurement: The gas component was detected by a quadrupole mass spectrometer.
Detection fragments: m/z=2, 18, 28, 42, 44
Measuring temperature: 400° C.
Measuring atmosphere: 1 vol % $C_3H_6$, 7 vol % to 8 vol % $H_2O$/He
Flow rate: 100 ml/min

TABLE 3

|  | Hydrogen ($H_2$) Concentration (vol %) |
|---|---|
| Reference 2-1 | 2.9 |
| Comparative Example 3-1 | 2.8 |
| Comparative Example 3-2 | 2.5 |

As seen in Table 3, Reference 2-1 exhibited higher hydrogen concentration than Comparative Example 3-1 and Comparative Example 3-2. This means the steam reforming reaction proceeds more effectively in Reference 2-1.

Example 2-1

(1) The Zr—La—Nd oxide was impregnated with rhodium (Rh) in a predetermined amount. Then, the oxide was dried and baked so that a Rh/Zr—La—Nd oxide powder was obtained. Then, pure water was added to the powder to a solid content of 40 mass %, and the powder was grinded. A slurry containing a first catalyst unit was thus obtained. By using the slurry, the average secondary particle size of the first catalyst unit (hydrogen generating catalyst) was measured. The result is shown in Table 4.
(2) The Zr—Ce—Nd oxide was impregnated with $LaSrFeO_3$ in a predetermined amount so that the iron (Fe) content became 5 mass %. Then, the oxide was dried and baked so that a $LaSrFeO_3$/Zr—Ce—Nd oxide powder was obtained. Then, pure water was added to the powder to a solid content of 40 mass %, and the powder was grinded. A slurry containing a second catalyst unit was thus obtained.
(3) The above-described slurries of steps (1) and (2) and boehmite, alumina and lanthanum nitrate were mixed in a predetermined amount so that a mixture slurry was obtained. Then, the mixture slurry was dried, and the dried mixture was baked at 550° C. for 3 hours. A surface layer powder was thus obtained.
(4) The above-described powder of step (3), a binder, nitric acid, pure water and a pore-forming material were charged into a ceramic pot, and the mixture was grinded by shaking with alumina balls. A surface layer slurry was thus obtained. By using the slurry, the average particle size of the exhaust gas purification catalyst powder was measured. The result is shown in Table 4.
(5) Aluminum oxide ($Al_2O_3$), a binder, nitric acid and pure water were charged into a ceramic pot, and the mixture was grinded by shaking with alumina balls. An inner layer slurry was thus obtained.
(6) The above-described inner layer slurry of step (5) was charged into a honeycomb support, and excess inner layer slurry was removed by means of air flow. Then, the support was dried at 120° C. The amount of coating was 113 g/L.
(7) The above-described surface layer slurry of step (4) was charged into the above-described support of step (6), and excess surface layer slurry was removed by means of air flow. Then, the support was dried at 120° C. Thereafter, the support was baked at 400° C. under air flow. An exhaust gas purification monolith catalyst of the example was thus obtained. The amount of coating was 124 g/L. The content of rhodium (Rh) in the exhaust gas purification monolith catalyst was 0.03 g/L.

Example 2-2

An exhaust gas purification monolith catalyst of the example was obtained by repeating the same process as in Example 2-1 except that the M1 element is changed from strontium (Sr) to barium (Ba).

Example 2-3

An exhaust gas purification monolith catalyst of the example was obtained by repeating the same process as in Example 2-1 except that the M1 element is changed from strontium (Sr) to calcium (Ca).

Example 2-4

An exhaust gas purification monolith catalyst of the example was obtained by repeating the same process as in Example 2-1 except that the M2 element is changed from iron (Fe) to manganese (Mn).

Example 2-5

An exhaust gas purification monolith catalyst of the example was obtained by repeating the same process as in Example 2-1 except that the M2 element is changed from iron (Fe) to cobalt (Co).

Example 2-6

An exhaust gas purification monolith catalyst of the example was obtained by repeating the same process as in Example 2-1 except that the Zr—Ce—Nd oxide was impregnated with $LaSrFeO_3$ in a predetermined amount so that the iron (Fe) content becomes 10 mass %.

Example 2-7

An exhaust gas purification monolith catalyst of the example was obtained by repeating the same process as in Example 2-1 except that the Zr—Ce—Nd oxide was impregnated with $LaSrFeO_3$ in a predetermined amount so that the iron (Fe) content becomes 15 mass %.

Example 2-8

An exhaust gas purification monolith catalyst of the example was obtained by repeating the same process as in Example 2-1 except that the amount of pore-forming material used in the preparation of the surface layer slurry was reduced by 80 mass %.

Example 2-9

An exhaust gas purification monolith catalyst of the example was obtained by repeating the same process as in Example 2-1 except that the Zr—Ce—Nd oxide was impregnated with $LaSrFeO_3$ in a predetermined amount so that the iron (Fe) content becomes 20 mass %.

Example 2-10

An exhaust gas purification monolith catalyst of the example was obtained by repeating the same process as in Example 2-1 except that the amount of pore-forming material used in the preparation of the surface layer slurry was reduced by 100 mass %.

Example 2-11

An exhaust gas purification monolith catalyst of the example was obtained by repeating the same process as in Example 2-1 except that the amount of pore-forming material used in the preparation of the surface layer slurry was increased by 20 mass %.

Example 2-12

An exhaust gas purification monolith catalyst of the example was obtained by repeating the same process as in Example 2-1 except that the grinding time of grinding the Rh/Zr—La—Nd oxide powder after adding pure water in the preparation of the slurry containing the first catalyst unit was reduced to a half.

Example 2-13

An exhaust gas purification monolith catalyst of the example was obtained by repeating the same process as in Example 2-1 except that the grinding time of the grinding by shaking with alumina balls after charging the surface layer powder, the binder, nitric acid, pure water, the pore-forming material into a ceramic pot in the preparation of the surface layer slurry was reduced to a half.

Example 2-14

An exhaust gas purification monolith catalyst of the example was obtained by repeating the same process as in Example 2-1 except that only the surface layer slurry was applied.

Comparative Example 4-1

(1) The Zr—La—Nd oxide was impregnated with rhodium (Rh) in a predetermined amount. Then, the oxide was dried and baked so that a Rh/Zr—La—Nd oxide powder was obtained. Then, pure water was added to the powder to a solid content of 40 mass %, and the powder was grinded, so that a slurry containing a first catalyst unit was obtained. By using the slurry, the average secondary particle size of the first catalyst unit (hydrogen generating catalyst) was measured. The result is shown in Table 4.
(2) The Zr—Ce—Nd oxide was impregnated with $LaSrFeO_3$ in a predetermined amount so that the iron (Fe) content became 5 mass %. Then, the oxide was dried and baked, so that the $LaSrFeO_3$/Zr—Ce—Nd oxide powder was obtained. Then, pure water was added to the powder to a solid content of 40 mass %, and the powder was grinded. A slurry containing the second catalyst unit was thus obtained.
(3) The above-described slurries of steps (1) and (2), a binder, nitric acid, pure water and a pore-forming material were charged into a ceramic pot, and the mixture was grinded by shaking with alumina balls, so that a surface layer slurry was obtained. By using the slurry, the average particle size of an exhaust gas purification catalyst powder was measured. The result was shown in Table 4.
(4) Aluminum oxide ($Al_2O_3$), a binder, nitric acid and pure water were charged into a ceramic pot, and the mixture was grinded by shaking with alumina balls. An inner layer slurry was thus obtained.
(5) The above-described inner layer slurry of step (4) was charged into a honeycomb support, and excess inner layer slurry was removed by means of air flow. Then, the support was dried at 120° C. The amount of coating was 113 g/L.
(6) The above-described surface layer slurry of step (3) was charged into the above-described support of step (5), and excess surface layer slurry was removed by means of air flow. Then, the support was dried at 120° C. Thereafter, the support was baked at 400° C. under air flow. The exhaust gas purification monolith catalyst of the Comparative Example was thus obtained. The amount of coating was 124 g/L. The content of rhodium (Rh) in the exhaust gas purification monolith catalyst was 0.03 g/L.

Comparative Example 4-2

(1) The Zr—La—Nd oxide was impregnated with rhodium (Rh) in a predetermined amount. Then, the oxide was dried and baked so that a Rh/Zr—La—Nd oxide powder was obtained. Then, pure water was added to the powder to a solid content of 40 mass %, and the powder was grinded, so that a slurry containing a first catalyst unit was obtained. By using the slurry, the average secondary particle size of the first catalyst unit (hydrogen generating catalyst) was measured. The result is shown in Table 4.
(2) Pure water was added to the Zr—Ce—Nd oxide powder to a solid content of 40 mass %, and the powder was grinded. A slurry containing the second catalyst unit was thus obtained.
(3) The above-described slurries of steps (1) and (2), a binder, nitric acid, pure water and a pore-forming material were charged into a ceramic pot, and the mixture was grinded by shaking with alumina balls, so that a surface layer slurry was obtained. By using the slurry, the average particle size of an exhaust gas purification catalyst powder was measured. The result is shown in Table 4.
(4) Aluminum oxide ($Al_2O_3$), a binder, nitric acid and pure water were charged into a ceramic pot, and the mixture was grinded by shaking with alumina balls. An inner layer slurry was thus obtained.
(5) The above-described inner layer slurry of step (4) was charged into a honeycomb support, and excess inner layer slurry was removed by means of air flow. Then, the support was dried at 120° C. The amount of coating was 113 g/L.
(6) The above-described surface layer slurry of step (3) was charged into the above-described support of step (5), and excess surface layer slurry was removed by means of air flow. Then, the support was dried at 120° C. Thereafter, the support was baked at 400° C. under air flow. The exhaust gas purification monolith catalyst of the Comparative Example was thus obtained. The amount of coating was 124 g/L. The content of rhodium (Rh) in the exhaust gas purification monolith catalyst was 0.03 g/L. The specification of each example is shown in Table 4. The pore volume was measured by the mercury intrusion method, in which a part of the honeycomb support coated with the exhaust gas purification catalyst was used. Further, the average secondary particle size of the first catalyst unit (hydrogen generating catalyst) and the average particle size of the exhaust gas purification catalyst powder were measured with a laser diffraction/scattering particle size distribution analyzer LA-920 produced by Horiba, Ltd. The numeral values in the table are D50 values at the time of the measurement.

(Performance Evaluation)

(HC Emission Measurement)

FIG. 7 is an explanatory view illustrating an arrangement of a catalyst in the HC emission measurement. As illustrated in FIG. 7, a three-way catalyst 2 was disposed directly below a 1.5 L displacement engine 100 of a vehicle produced by Nissan Motor Co., Ltd (i.e. in a manifold of the engine), and an exhaust gas purification monolith catalyst 1 of each example that has been subjected to the endurance treatment in the following conditions was disposed in the downstream thereof. The vehicle was run in the NEDC mode (cold start), and the HC emission was measured for the exhaust gas purification monolith catalyst of each example. The results are shown in Table 4.

(Endurance Conditions)

A catalyst was disposed to the rear of a V type-6 cylindered 3.5 L engine produced by Nissan Motor Co., Ltd. The temperature at the catalyst inlet was adjusted to 840° C., and the catalyst was placed under exhaust gas atmosphere for 250 hours. The catalyst was thus subjected to an endurance treatment. The fuel used was lead free gasoline.

TABLE 4

| | Noble Metal | Noble Metal Content (g/L) | Oxide | M1 Element | M2 Element | M2 Element Content (mass %) |
|---|---|---|---|---|---|---|
| Example 2-1 | Rh | 0.03 | Zr—La—Nd Oxide | Sr | Fe | 5 |
| Example 2-2 | Rh | 0.03 | Zr—La—Nd Oxide | Ba | Fe | 5 |
| Example 2-3 | Rh | 0.03 | Zr—La—Nd Oxide | Ca | Fe | 5 |
| Example 2-4 | Rh | 0.03 | Zr—La—Nd Oxide | Sr | Mn | 5 |
| Example 2-5 | Rh | 0.03 | Zr—La—Nd Oxide | Sr | Co | 5 |
| Example 2-6 | Rh | 0.03 | Zr—La—Nd Oxide | Sr | Fe | 10 |
| Example 2-7 | Rh | 0.03 | Zr—La—Nd Oxide | Sr | Fe | 15 |
| Example 2-8 | Rh | 0.03 | Zr—La—Nd Oxide | Sr | Fe | 5 |
| Example 2-9 | Rh | 0.03 | Zr—La—Nd Oxide | Sr | Fe | 20 |
| Example 2-10 | Rh | 0.03 | Zr—La—Nd Oxide | Sr | Fe | 5 |
| Example 2-11 | Rh | 0.03 | Zr—La—Nd Oxide | Sr | Fe | 5 |
| Example 2-12 | Rh | 0.03 | Zr—La—Nd Oxide | Sr | Fe | 5 |
| Example 2-13 | Rh | 0.03 | Zr—La—Nd Oxide | Sr | Fe | 5 |
| Example 2-14 | Rh | 0.03 | Zr—La—Nd Oxide | Sr | Fe | 5 |
| Comparative Example 4-1 | Rh | 0.03 | Zr—La—Nd Oxide | Sr | Fe | 5 |
| Comparative Example 4-2 | Rh | 0.03 | Zr—La—Nd Oxide | — | — | 0 |

| | Oxygen Storage/Release Material | Pore Volume of 0.1-1 μm Pores (cm³/g) | Average Secondary Particle Size of Hydrogen Generating Catalyst (nm) | Average Particle Size of Exhaust Gas Purification Catalyst (μm) | Undercoat Layer | Separation Structure | HC Emission (g/test) |
|---|---|---|---|---|---|---|---|
| Example 2-1 | Zr—Ce—Nd Oxide | 0.068 | 157 | 3.1 | Yes | Yes | 0.146 |
| Example 2-2 | Zr—Ce—Nd Oxide | 0.054 | 159 | 2.8 | Yes | Yes | 0.158 |
| Example 2-3 | Zr—Ce—Nd Oxide | 0.058 | 166 | 3.4 | Yes | Yes | 0.163 |
| Example 2-4 | Zr—Ce—Nd Oxide | 0.061 | 183 | 3.2 | Yes | Yes | 0.166 |
| Example 2-5 | Zr—Ce—Nd Oxide | 0.058 | 157 | 3.3 | Yes | Yes | 0.159 |
| Example 2-6 | Zr—Ce—Nd Oxide | 0.059 | 166 | 2.9 | Yes | Yes | 0.171 |
| Example 2-7 | Zr—Ce—Nd Oxide | 0.059 | 174 | 3.3 | Yes | Yes | 0.185 |
| Example 2-8 | Zr—Ce—Nd Oxide | 0.044 | 183 | 3.1 | Yes | Yes | 0.216 |
| Example 2-9 | Zr—Ce—Nd Oxide | 0.049 | 156 | 2.7 | Yes | Yes | 0.246 |
| Example 2-10 | Zr—Ce—Nd Oxide | 0.038 | 172 | 2.8 | Yes | Yes | 0.223 |
| Example 2-11 | Zr—Ce—Nd Oxide | 0.073 | 155 | 3.4 | Yes | Yes | 0.304 |
| Example 2-12 | Zr—Ce—Nd Oxide | 0.066 | 325 | 3.1 | Yes | Yes | 0.227 |
| Example 2-13 | Zr—Ce—Nd Oxide | 0.062 | 152 | 6.7 | Yes | Yes | 0.294 |
| Example 2-14 | Zr—Ce—Nd Oxide | 0.059 | 165 | 3.4 | No | Yes | 0.235 |
| Comparative Example 4-1 | Zr—Ce—Nd Oxide | 0.055 | 163 | 3.0 | Yes | No | 0.266 |
| Comparative Example 4-2 | Zr—Ce—Nd Oxide | 0.064 | 168 | 3.1 | Yes | No | 0.252 |

As seen in Table 4, inventive Example 2-1 to Example 2-5 and Example 2-9 exhibited less HC emission compared to non-inventive Comparative Example 4-1 and Comparative Example 4-2.

Further, as seen in Table 4, when comparing inventive Example 2-1, Example 2-6, Example 2-7 and Example 2-9 to each other, Example 2-1, Example 2-6 and Example 2-7 exhibited less HC emission, which contain the M2 element in the amount of 15 mass % or less.

Further, as seen in Table 4, when comparing inventive Example 2-1, Example 2-10 and Example 2-11 to each other, Example 2-1 exhibited less HC emission, which has a pore volume of pores with a pore size of from 0.1 μm to 1 μm of from 0.03 cm³/g to 0.07 cm³/g.

Further, as seen in Table 4, when comparing inventive Example 2-1 and Example 2-12 to each other, Example 2-1 exhibited less HC emission, which has an average secondary particle size of the hydrogen generating catalyst of 300 nm or less.

Further, as seen in Table 4, when comparing inventive Example 2-1 and Example 2-13 to each other, Example 2-1 exhibited less HC emission, which has an average particle size of the exhaust gas purification catalyst of 6 μm or less.

Further, as seen in Table 4, when comparing inventive Example 2-1 and Example 2-14 to each other, Example 2-1 exhibited less HC emission, which includes the undercoat layer.

Example 3-1

An exhaust gas purification monolith catalyst of the example was obtained by repeating the same process as in Example 2-1 except that the hydrogen generating catalyst of Reference 2-1 was used.

Comparative Example 5-1

An exhaust gas purification monolith catalyst of the example was obtained by repeating the same process as in Example 2-1 except that the hydrogen generating catalyst of Comparative Example 3-1 was used.
(Performance Evaluation)
(Exhaust Gas Purification Performance Test)

As illustrated in FIG. 7, a three-way catalyst 2 was disposed directly below a 1.5 L displacement engine 100 of a vehicle produced by Nissan Motor Co., Ltd (i.e. in a manifold of the engine), and an exhaust gas purification monolith catalyst 1 of each example that has been subjected to the endurance treatment in the following conditions was disposed in the downstream thereof. The vehicle was run in the NEDC mode (cold start), and the HC conversion rate, the CO conversion rate and the $NO_x$ conversion rate were measured for the exhaust gas purification monolith catalyst of each example. The temperature at the catalyst inlet was 350° C. The results are shown in FIG. 9.

(Endurance Conditions)

A catalyst was disposed to the rear of a V type-6 cylindered 3.5 L engine produced by Nissan Motor Co., Ltd. The temperature at the catalyst inlet was adjusted to 840° C., and the catalyst was placed under exhaust gas atmosphere for 250 hours. The catalyst was thus subjected to an endurance treatment. The fuel used was lead free gasoline.

Figure 9:
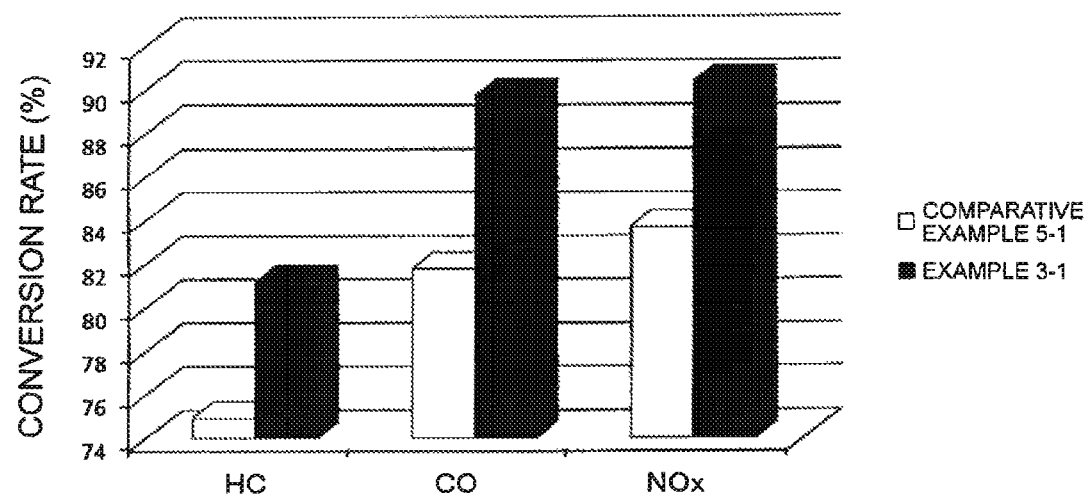
FIG. 9 is a graph illustrating the conversion rates of hydrocarbons (HC), carbon monoxide (CO) and nitrogen oxides ($NO_x$) of various examples.

As seen in FIG. 9, an inventive Example 3-1 exhibited better conversion rate than a non-inventive Comparative Example 5-1 by approximately 8%.

While the present invention was described with some embodiments and examples, the present invention is not limited to these embodiments and examples, and a various changes can be made within the gist of the present invention.

For example, the configurations of the exhaust gas purification catalyst and the exhaust gas purification monolith catalyst described in the above-described embodiments and examples are not limited to the individual embodiments and examples. For example, the combination of the configuration of an embodiment and example may be changed beyond the configurations of the embodiments and examples, or the details of the configuration can be changed.

REFERENCE SIGNS LIST

1 Exhaust gas purification monolith catalyst
2 Three-way catalyst
10 Catalyst layer
11 Exhaust gas purification catalyst
12 First catalyst unit (hydrogen generating catalyst)
12a Noble metal
12b Oxide
14 Second catalyst unit
14a Oxygen storage/release material
14b Perovskite oxide
16 Holding material
20 Undercoat layer
30 Monolith support
30a Exhaust gas channel
100 Engine

The invention claimed is:

1. An exhaust gas purification catalyst, comprising:
a first catalyst unit consisting of a hydrogen generating catalyst;
a second catalyst unit consisting of an oxygen storage/release material and a perovskite oxide disposed in contact with the oxygen storage/release material; and
a holding material that holds the first catalyst unit and the second catalyst unit in a mutually separated state,
wherein the hydrogen generating catalyst consists of a noble metal and an oxide that supports the noble metal, in which the oxide contains lanthanum, zirconium and at least one additional element selected from the group consisting of neodymium, samarium, europium, magnesium and calcium, and
the perovskite oxide is represented by the following general formula (1):

$$La_xM1_{1-x}M2O_{3-\delta} \quad (1)$$

where La is lanthanum, M1 is at least one element selected from the group consisting of barium (Ba), strontium (Sr) and calcium (Ca), M2 is at least one element selected from the group consisting of iron (Fe), cobalt (Co) and manganese (Mn), x satisfies 0<x≤1, and δ satisfies 0≤δ≤1.

2. An exhaust gas purification catalyst, comprising:
a first catalyst unit consisting of a hydrogen generating catalyst;
a second catalyst unit consisting of an oxygen storage/release material and a perovskite oxide disposed in contact with the oxygen storage/release material; and
a holding material that holds the first catalyst unit and the second catalyst unit in a mutually separated state,
wherein the hydrogen generating catalyst comprises a noble metal and a complex oxide that supports the noble metal, in which the complex oxide contains lanthanum, zirconium and at least one additional element selected from the group consisting of neodymium, samarium, europium, magnesium and calcium, and
the perovskite oxide is represented by the following general formula (1):

$$La_xM1_{1-x}M2O_{3-\delta} \quad (1)$$

where La is lanthanum, M1 is at least one element selected from the group consisting of barium (Ba), strontium (Sr) and calcium (Ca), M2 is at least one element selected from the group consisting of iron (Fe), cobalt (Co) and manganese (Mn), x satisfies 0<x≤1, and δ satisfies 0≤δ≤1.

3. The exhaust gas purification catalyst according to claim 1, wherein a content of M2 in the perovskite oxide is equal to or less than 15 mass %.

4. The exhaust gas purification catalyst according to claim 1, wherein a pore volume of pores with a pore size of from 0.1 μm to 1 μm is within the range of 0.04 cm$^3$/g to 0.07 cm$^3$/g.

5. The exhaust gas purification catalyst according to claim 1, wherein an average secondary particle size of the hydrogen generating catalyst is equal to or less than 300 nm.

6. The exhaust gas purification catalyst according to claim 1, wherein an average particle size is equal to or less than 6 μm.

7. The exhaust gas purification catalyst according to claim 1, wherein the oxygen storage/release material contains cerium and zirconium.

8. The exhaust gas purification catalyst according to claim 1, wherein the noble metal is rhodium, and the additional element is neodymium.

9. The exhaust gas purification catalyst according to claim 1, wherein the holding material contains aluminum and lanthanum.

10. The exhaust gas purification catalyst according to claim 2, wherein a content of M2 in the perovskite oxide is equal to or less than 15 mass %.

11. The exhaust gas purification catalyst according to claim 2, wherein a pore volume of pores with a pore size of from 0.1 μm to 1 μm is within the range of 0.04 cm$^3$/g to 0.07 cm$^3$/g.

12. The exhaust gas purification catalyst according to claim 2, wherein an average secondary particle size of the hydrogen generating catalyst is equal to or less than 300 nm.

13. The exhaust gas purification catalyst according to claim 2, wherein an average particle size is equal to or less than 6 μm.

14. The exhaust gas purification catalyst according to claim 2, wherein the oxygen storage/release material contains cerium and zirconium.

15. The exhaust gas purification catalyst according to claim 2, wherein the noble metal is rhodium, and the additional element is neodymium.

16. The exhaust gas purification catalyst according to claim 2, wherein the holding material contains aluminum and lanthanum.

17. An exhaust gas purification monolith catalyst, wherein a catalyst layer is formed in an exhaust gas channel of a monolith support, and the catalyst layer contains an exhaust gas purification catalyst, comprising:
   a first catalyst unit consisting of a hydrogen generating catalyst;
   a second catalyst unit consisting of an oxygen storage/release material and a perovskite oxide disposed in contact with the oxygen storage/release material; and
   a holding material that holds the first catalyst unit and the second catalyst unit in a mutually separated state,
   wherein the hydrogen generating catalyst consists of a noble metal and an oxide that supports the noble metal, in which the oxide contains lanthanum, zirconium and at least one additional element selected from the group consisting of neodymium, samarium, europium, magnesium and calcium, and
   the perovskite oxide is represented by the following general formula (1):

$$La_xM1_{1-x}M2O_{3-\delta} \qquad (1)$$

where La is lanthanum, M1 is at least one element selected from the group consisting of barium (Ba), strontium (Sr) and calcium (Ca), M2 is at least one element selected from the group consisting of iron (Fe), cobalt (Co) and manganese (Mn), x satisfies 0<x≤1, and δ satisfies 0≤δ≤1.

18. The exhaust gas purification monolith catalyst according to claim 17, further comprising an undercoat layer that contains a heat-resistant inorganic oxide and is disposed in a lowermost layer of the catalyst layer.

19. An exhaust gas purification monolith catalyst, wherein a catalyst layer is formed in an exhaust gas channel of a monolith support, and the catalyst layer contains an exhaust gas purification catalyst, comprising:
   a first catalyst unit consisting of a hydrogen generating catalyst;
   a second catalyst unit consisting of an oxygen storage/release material and a perovskite oxide disposed in contact with the oxygen storage/release material; and
   a holding material that holds the first catalyst unit and the second catalyst unit in a mutually separated state,
   wherein the hydrogen generating catalyst comprises a noble metal and a complex oxide that supports the noble metal, in which the complex oxide contains lanthanum, zirconium and at least one additional element selected from the group consisting of neodymium, samarium, europium, magnesium and calcium, and
   the perovskite oxide is represented by the following general formula (1):

$$La_xM1_{1-x}M2O_{3-\delta} \qquad (1)$$

where La is lanthanum, M1 is at least one element selected from the group consisting of barium (Ba), strontium (Sr) and calcium (Ca), M2 is at least one element selected from the group consisting of iron (Fe), cobalt (Co) and manganese (Mn), x satisfies 0<x≤1, and δ satisfies 0≤δ≤1.

20. The exhaust gas purification monolith catalyst according to claim 19, further comprising an undercoat layer that contains a heat-resistant inorganic oxide and is disposed in a lowermost layer of the catalyst layer.

* * * * *